US006937673B2

(12) United States Patent
Kim

(10) Patent No.: US 6,937,673 B2
(45) Date of Patent: Aug. 30, 2005

(54) METHOD OF COMPENSATING FREQUENCY ERROR IN COMMUNICATION SYSTEM AND APPARATUS FOR THE SAME

(75) Inventor: Jong Heon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 93 days.

(21) Appl. No.: 10/330,334

(22) Filed: Dec. 30, 2002

(65) Prior Publication Data

US 2003/0123527 A1 Jul. 3, 2003

(30) Foreign Application Priority Data

Dec. 29, 2001 (KR) .................................. 10-2001-0088415

(51) Int. Cl.[7] .............................................. H04L 27/06
(52) U.S. Cl. ..................... 375/344; 375/130; 370/525
(58) Field of Search ................................ 375/130, 140, 375/144, 147, 148, 344, 346, 348, 285, 372, 362; 370/525, 491; 455/71, 192.1, 192.2, 205

(56) References Cited

U.S. PATENT DOCUMENTS

| 6,201,499 | B1 | * | 3/2001 | Hawkes et al. | ............. | 342/387 |
|---|---|---|---|---|---|---|
| 6,625,237 | B2 | * | 9/2003 | Talwalkar et al. | .......... | 375/344 |
| 6,678,317 | B1 | * | 1/2004 | Murakami et al. | .......... | 375/232 |
| 2002/0009064 | A1 | * | 1/2002 | Blessent et al. | ............ | 370/335 |
| 2002/0097813 | A1 | * | 7/2002 | Vaidyanathan | ............... | 375/326 |
| 2002/0196768 | A1 | * | 12/2002 | Ohgoshi et al. | ............ | 370/342 |
| 2003/0026361 | A1 | * | 2/2003 | Talwalkar et al. | .......... | 375/344 |
| 2003/0128678 | A1 | * | 7/2003 | Subrahmanya et al. | ..... | 370/335 |

* cited by examiner

*Primary Examiner*—Jean B. Corrielus
(74) *Attorney, Agent, or Firm*—Fleshner & Kim, LLP

(57) ABSTRACT

Disclosed is a method of compensating a frequency error and an apparatus for the same in the communication system suitable to the frequency error compensation. The method includes the steps of despreading the signal, estimating a frequency error value by differentiating the despread signal, generating a tone based on the frequency error value, and compensating for a frequency error of the despread signal based on the tone.

36 Claims, 6 Drawing Sheets

METHOD OF COMPENSATING FREQUENCY ERROR IN COMMUNICATION SYSTEM AND APPARATUS FOR THE SAME

This application claims the benefit of the Korean Application No. P2001-88415 filed on Dec. 29, 2001, which is hereby incorporated by reference.

BACKGROUND OF THE INVENTION

1. Field of the Invention

The present invention relates generally to a communication system, and more particularly, to a method of compensating a frequency error and an apparatus for the same in the communication system.

2. Background of the Related Art

Typically, a conventional frequency error compensation method in a communication system will be explained with reference to the accompanying drawings.

FIG. 1 is a block diagram of a conventional synchronous demodulating apparatus in a CDMA system.

Referring to FIG. 1, the conventional synchronous demodulating apparatus includes a despreader 10 for despreading a received signal r(t) with a Pseudo Noise (PN) code, a Walsh decover 20 for discovering the despread signal outputted from the despreader 10 with a predetermined Walsh code so as to obtain data symbols, a phase estimator 30 for estimating a phase error from a pilot signal of the despread signal outputted from the despreader 10, and a phase rotator 40 for compensating the received signal for the phase error estimated by the phase estimator 30.

Herein, the received signal r(t) is expressed by the following equation 1.

$$r(t) = PN(t)(\sqrt{P_p} + \sqrt{P_d} w(t) d(t)) e^{j(2 \times \Delta f(t)t + \Delta \phi(t))} \quad \text{[Equation 1]}$$

Wherein, PN(t) denotes a PSEUDO NOISE (PN) code, $P\_p$ a pilot power, $P\_d$ a data symbol power, w(t) a Walsh code, d(t) a data symbol, $\Delta f(t)$ a frequency error, and $\Delta \phi(t)$ a phase error, respectively.

An output of the phase estimator 30 is given by the following equation 2.

$$\sqrt{P_p} e^{j\Delta\phi(t)} \quad \text{[Equation 2]}$$

An output of the Walsh decover 20 is given by the following equation 3.

$$\sqrt{P_d} d(t) e^{j(2 \times \Delta f(t)t + \Delta \phi(t))} \quad \text{[Equation 3]}$$

Finally, an output of the phase rotator 40 is given by the following equation 4.

$$\sqrt{P_d} d(t) e^{j(2*\Delta f(t)t + \Delta\phi(t))} \times \sqrt{P_p} e^{-j\Delta\phi(t)} = \sqrt{P_d P_p} d(t) e^{j2\pi\Delta f(t)t} \quad \text{[Equation 4]}$$

Herein, the phase estimator 30 comprises an accumulator 31 for accumulating the pilot signal, and a pilot filter 32 for estimating the phase error of the accumulated pilot signal.

At this time, components that distort the signal are produced due to phase and frequency differences, and especially, a frequency error may be produced due to a Doppler frequency shift caused by movement of a mobile station.

However, the conventional demodulating apparatus of FIG. 1 just detects the phase error through the phase estimator and corrects the phase error through the phase rotator, but does not correct the frequency error.

Thus, according to the conventional demodulating apparatus, though it does not matter in a static environment in which the size of the frequency error is small, the frequency error cannot be corrected in a mobile environment in which the mobile station moves, and this deteriorates a performance of receiving a signal.

SUMMARY OF THE INVENTION

An object of the present invention is directed to a method of compensating a frequency error and an apparatus for the same in the communication system that substantially obviates one or more problems due to limitations and disadvantages of the related art.

Another object of the present invention is to provide a method of compensating a frequency error and an apparatus for the same in the communication system that can improve the receiving performance in a mobile environment of a mobile station by compensating a frequency error with the addition of a frequency estimator for the frequency error compensation to a synchronous demodulating apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of compensating a frequency error in a communication system, comprises the steps of despreading the signal, estimating a frequency error value by differentiating the despread signal, generating a tone based on the frequency error value, and compensating for a frequency error of the despread signal based on the tone.

Preferably, the frequency error of the despread signal is compensated for at a symbol level.

Preferably, the method further comprises the steps of generating addresses corresponding to the frequency error value and latching tone samples mapped onto the addresses corresponding to a symbols-length of the despread signal. Preferably, the addresses for positive tone samples if a polarity of the frequency error value is negative are generated. Preferably, the addresses for negative tone samples if a polarity of the frequency error value is positive are generated. Preferably, the addresses for tone samples having a frequency increased in proportion to the frequency error value are generated.

Preferably, the method further comprising the step of outputting first tone samples mapped onto a first address and second tone samples, which is mapped onto a second address having a predetermined frequency offset over the first tone samples.

Preferably, the addresses are adjusted so as not to get out of a size of corresponding storing sections which store the tone samples.

Preferably, the frequency error of the despread signal is compensated for at a chip level.

Preferably, the method comprises the steps of generating addresses corresponding to the frequency error value and a control signal according to a type of the addresses, and latching tone samples mapped onto the addresses corresponding to a length of chips of the despread signal. Preferably, the addresses for positive tone samples if a polarity of the frequency error value is negative are generated. Preferably, the addresses for negative tone samples if a polarity of the frequency error value is positive are also generate. Preferably, the addresses for tone samples having a frequency increased in proportion to the frequency error value are generated.

Preferably, the method comprises the steps of outputting with a time division method first tone samples mapped onto a first address and second tone samples, which are mapped onto a second address and have a predetermined phase offset over the first tone samples and demultiplexing the first tone samples and the second tone samples according to the control signal.

Preferably, the addresses are adjusted so as not to get out of a size of a storing section which stores the tone samples.

Preferably, the first address and the second address are outputted according to a time division method.

Preferably, the method further comprises the steps of outputting complex tone samples of first tone samples mapped onto a first address and second tone samples, which are mapped onto a second address and have a predetermined phase offset over the first tone samples, and demultiplexing the first tone samples and the second tone samples according to the control signal.

According to another aspect of the present invention, an apparatus of correcting frequency error in communication system, comprises a despreader for despreading the signal, a frequency error estimator for obtaining a frequency error value by differentiating the despread signal, a tone generator for generating a tone based on the frequency error value, and a compensator for compensating for a frequency error of the despread signal based on the tone.

Preferably, the compensator compensates the frequency error of the despread signal at a symbol level.

Preferably, the apparatus further comprises an address generator for generating addresses corresponding to the frequency error value, and a plurality of latches for latching tone samples mapped onto the address corresponding to a symbols-length of the despread signal. Preferably, the address generator generates the addresses for positive tone samples if a polarity of the frequency error value is negative. Preferably, the address generator generates the addresses for negative tone samples if a polarity of the frequency error value is positive. Preferably, the address generator generates the addresses for tone samples having a frequency increased in proportion to the frequency error value. Preferably, the address generator adjusts the addresses so as not to get out of a size of the memories.

Preferably, the apparatus further comprises memories for generating first tone samples mapped onto a first address and second tone samples, which are mapped onto a second address and have a predetermined frequency offset over the first tone samples.

Preferably, the compensator compensates for the frequency error of the despread signal at a chip level.

Preferably, the tone generator comprises an address generator for generating addresses corresponding to the frequency error value and a control signal according to a type of the addresses, and a plurality of latches for latching tone samples mapped onto the address corresponding to a length of chips of the despread signal. Preferably, the address generator generates the addresses for positive tone samples if a polarity of the frequency error value is negative. Preferably, the address generator generates the addresses for negative tone samples if a polarity of the frequency error value is positive. Preferably, the address generator generates the addresses for tone samples having a frequency increased in proportion to the frequency error value.

Preferably, the apparatus further includes a memory for storing first tone samples mapped onto a first address and second tone samples, which are mapped onto a second address and have a predetermined phase offset over the first tone samples and outputting the tone samples with a time division method, and a demultiplexer for demultiplexing the first tone samples and the second tone samples according to the control signal. Preferably, the address generator adjusts the addresses so as not to get out of a size of the memory. Preferably, the address generator outputs the first address and the second address according to a time division method.

Preferably, the tone generator further comprises a memory for outputting complex tone samples of first tone samples mapped onto a first address and second tone samples, which are mapped onto a second address and have a predetermined phase offset over the first tone samples and storing the tone samples, and demultiplexing the first tone samples and the second tone samples according to the control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
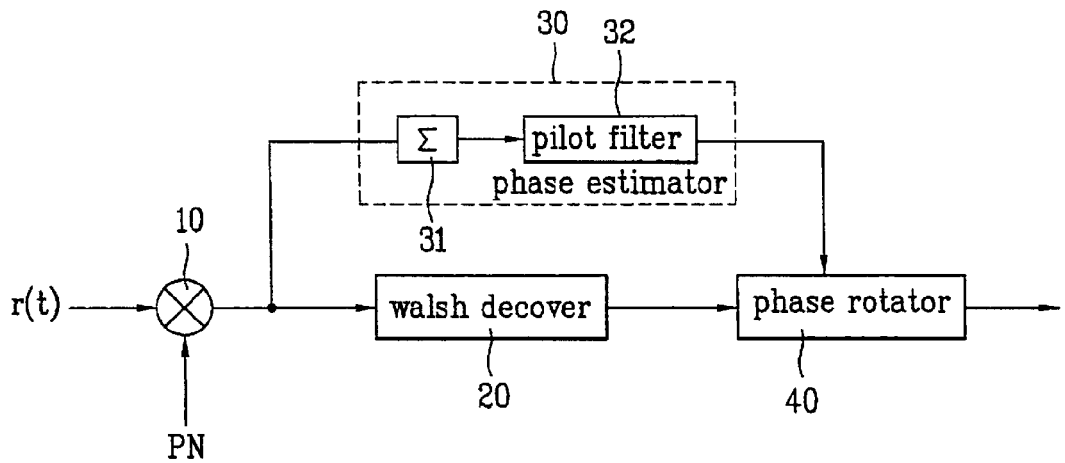
FIG. 1 is a block diagram of a conventional synchronous demodulating apparatus in a communication system.
Figure 2:
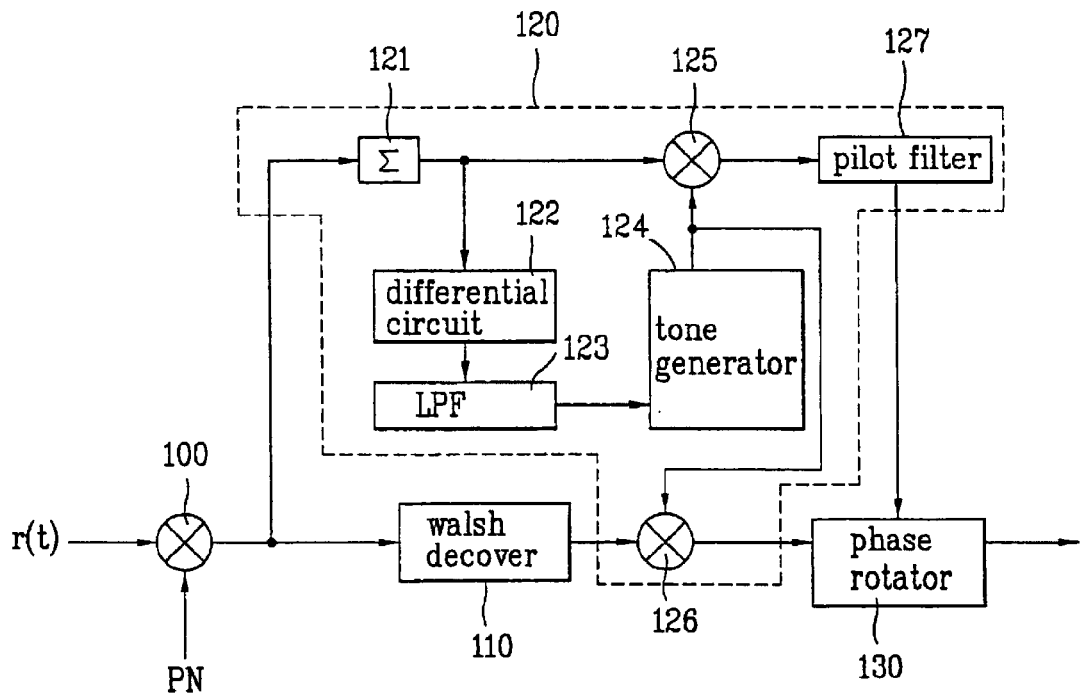
FIG. 2 is a block diagram of a frequency error compensation apparatus in a communication system according to a first preferred embodiment of the present invention.

FIG. 2 is a block diagram of a frequency error compensation apparatus in a communication system according to a first preferred embodiment of the present invention.

The frequency error compensating apparatus includes a despreader 100 for dispreading a received signal r(t) with a PN code, a Walsh decover 110 for decovering the despread signal outputted from the despreader 100 with predetermined Walsh code so as to obtain data symbols and output the data symbols to a phase rotator 130, a phase frequency estimator 120 for estimating a frequency error value from a pilot signal separated from the despread signal by differentiating a phase of the pilot signal and a phase error value from the pilot signal which is compensated for the frequency error value, and a phase rotator 130 for compensating the data symbols for the phase error value and frequency error value estimated by the phase and frequency estimator 120.

The phase and frequency error estimator 120 includes an accumulator 121 for optionally accumulating the pilot signal separated from the despread signal during a predetermined time so as to matching a speed of the walsh-discovering procedure with that of the frequency error and phase error-compensating procedure, a differential circuit 122 for estimating the frequency error value by differentiating a phase of the pilot signal or the accumulated signal of the accumulator 121, a low pass filter (LPF) 123 for optionally removing undesired component from the estimated frequency error value, a tone generator 124 for generating a tone (e.g., frequency) for compensating the data symbols for the estimated frequency error value, a first multiplier 125 for multiplying the tone generated from the tone generator 124 by the accumulated signal of the accumulator 121 or the pilot signal and outputting a first multiplied value to a pilot filter 127, a second multiplier 126 for multiplying the tone generated from the tone generator 124 by an output value (data symbols) of the Walsh decover 110 and outputting a second multiplied value to the phase rotator 130, and the pilot filter 127 for estimating phase error value from the first multiplied value.

Herein, the received signal is the same as that expressed as equation 1.

Meanwhile, an output of the accumulator 121 is given by the following equation 5.

$$\sqrt{P_p}e^{j(2\times\Delta f(t)t+\Delta\phi(t))} \quad \text{[Equation 5]}$$

An output of the Walsh decover 110 is given by the following equation 6.

$$\sqrt{P_d}d(t)e^{j(2\times\Delta f(t)t+\Delta\phi(t))} \quad \text{[Equation 6]}$$

An output of the tone generator 124 is given by the following equation 7.

$$e^{j2\times\Delta\hat{f}(t)} \quad \text{[Equation 7]}$$

An output of the pilot filter 127 is given by the following equation 8.

$$\sqrt{P_n}\,e^{j\{2\pi(\Delta f(t)-\Delta\hat{f}(t))+\Delta\phi(t)\}} = \sqrt{P_p}\,e^{j(\varphi(t)+\Delta\phi(t))} \quad \text{[Equation 8]}$$

Herein, $$\varphi(t) \approx 2\pi(\Delta f(t) - \Delta\hat{f}(t))t$$

Finally, an output of the phase rotator 130 is given by the following equation 9.

$$\sqrt{P_d}\,d(t)e^{j\{\varphi(t)+\Delta\phi(t)\}} \times \sqrt{P_p}\,e^{-j\{\varphi(t)+\Delta\phi(t)\}} \quad \text{[Equation 9]}$$
$$= x$$
$$= \sqrt{P_dP_p}\,d(t)$$

Figure 3:
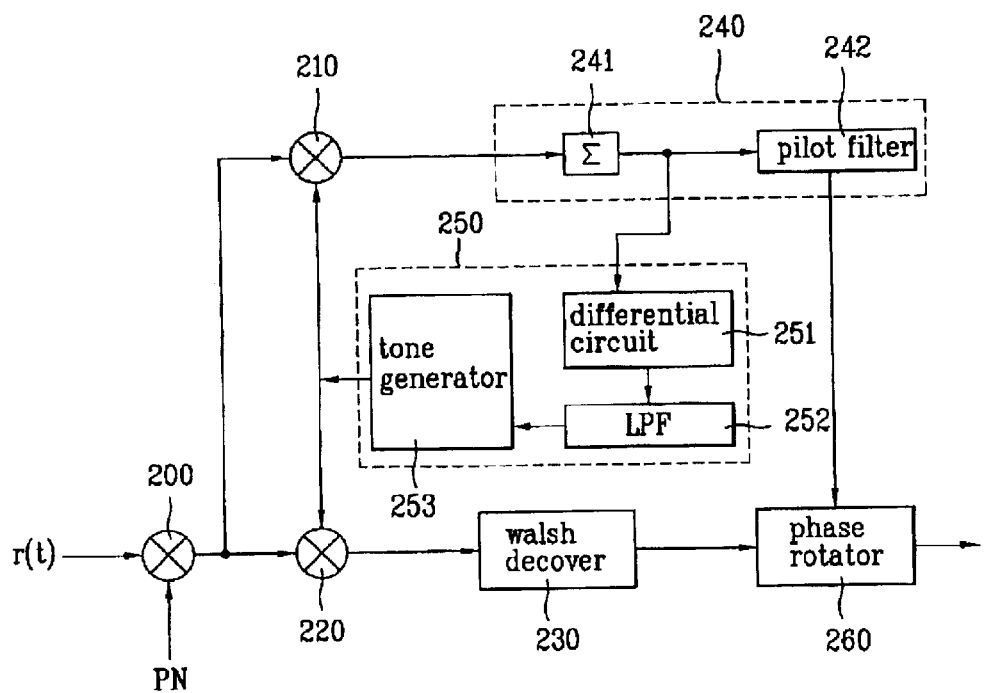
FIG. 3 is a block diagram of a frequency error compensation apparatus in a communication system according to a second preferred embodiment of the present invention.

FIG. 3 is a block diagram of a frequency error compensation apparatus in a communication system according to a second preferred embodiment of the present invention.

The frequency error compensation apparatus includes a despreader 200 for despreading a received signal r(t) with a PN code, a first multiplier 210 for multiplying a pilot signal separated from the despread signal by frequency error value outputted from a frequency error estimator 250 and outputting a first multiplied signal to a phase estimator 240, a second multiplier 220 for multiplying the despread signal by the frequency error value outputted from the frequency error estimator 250 and outputting a second multiplied signal to a Walsh decover 230, the phase estimator 240 for receiving the first multiplied signal outputted from the first multiplier 210, estimating phase error value of the first multiplied signal, and outputting the phase error value to a phase rotator 260, a Walsh decover 230 for receiving the second multiplied signal outputted from the second multiplier 220 and discovering the second multiplied signal with walsh code so as to obtain data symbols, and the phase rotator 260 for compensating the second multiplied signal for the phase error value estimated by the phase estimator 240.

Herein, the phase estimator 240 includes an accumulator 121 for optionally accumulating the first multiplied signal during a predetermined period, and a pilot filter 242 for estimating the phase error value of the first multiplied signal or the accumulated signal.

The frequency error estimator 250 includes a differential circuit 251 for receiving the first multiplied signal or the accumulated signal and estimating the frequency error value by differentiating a phase of the first multiplied signal or the accumulated signal, a low pass filter (LPF) 252 for optionally removing an undesired component from the estimated frequency error value, and a tone generator 253 for generating a tone for compensating for the estimated frequency error value.

That is, in the general CDMA communication system, PN chips with a plurality of spreading factors SFs are mapped onto one symbol. Thus, a PN chip rate is SF times as high as a symbol rate.

In FIG. 2, the frequency error compensation is performed at a symbol level, and the frequency error estimator is combined with the existing phase estimator. In FIG. 3, the frequency error compensation is performed at a PN chip level, and the frequency error estimator 250 is constructed, being separated from the phase estimator 240.

Figure 4:
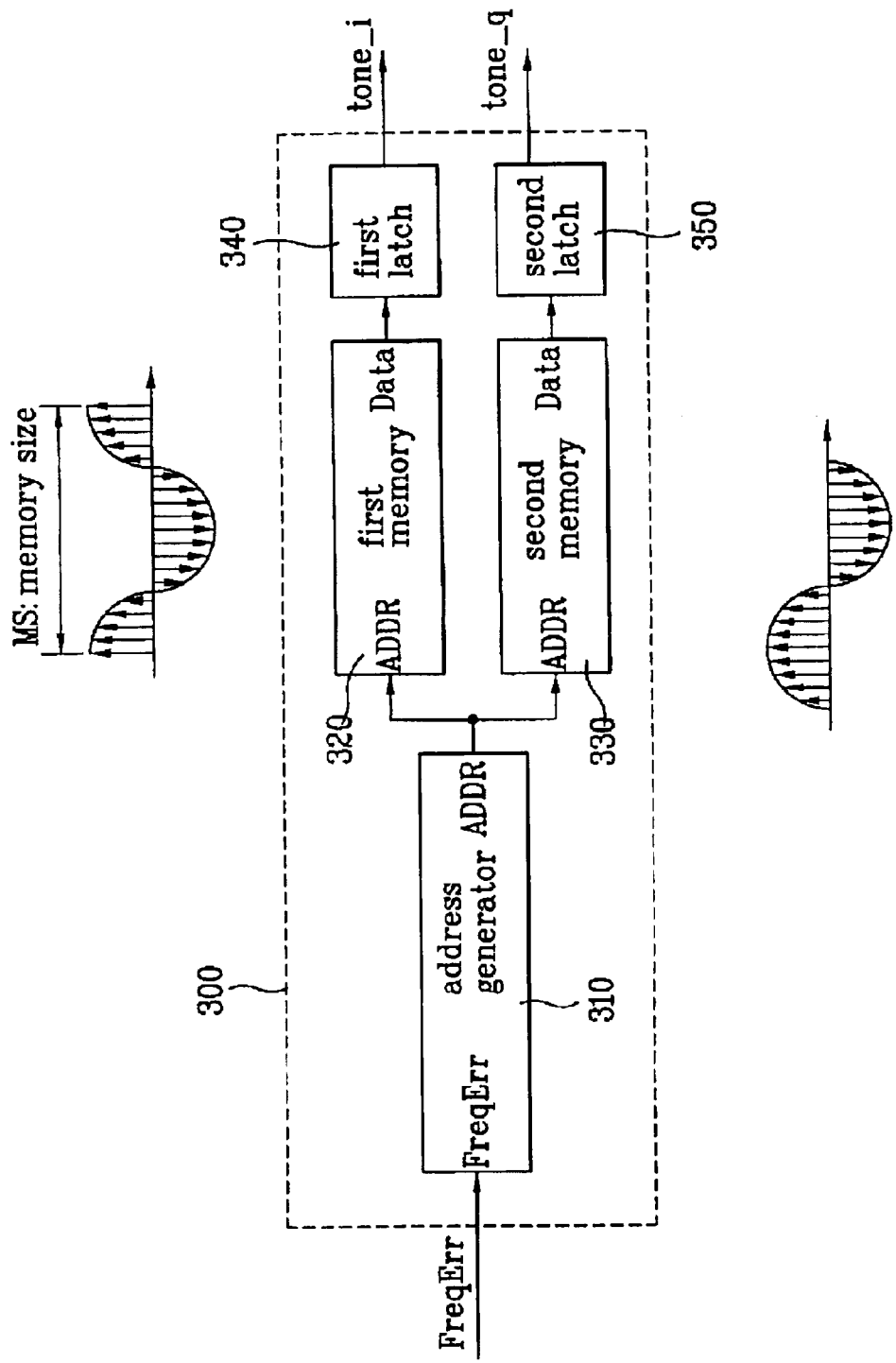
FIG. 4 is a block diagram of a tone generator of FIG. 2 according to the first preferred embodiment of the present invention.

FIG. 4 is a detailed block diagram of a tone generator of FIG. 2 according to the first preferred embodiment of the present invention.

Figure 5:
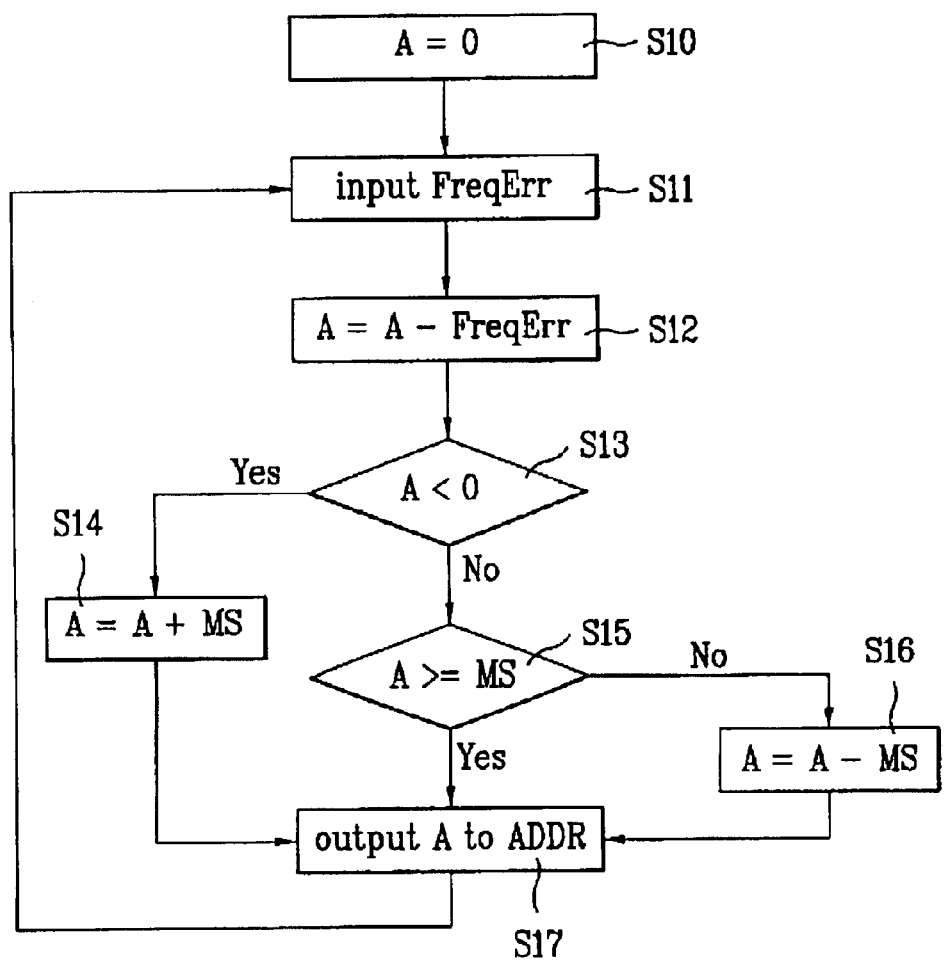
FIG. 5 is a flowchart illustrating a frequency error compensation method for a frequency error compensation apparatus provided with the tone generator of FIG. 4.

FIG. 5 is a flowchart illustrating a frequency error compensation method for a frequency error compensation apparatus provided with the tone generator of FIG. 4.

Referring to FIG. 4, the tone generator 300 includes an address generator 310 for generating an address so as to adjust a frequency of a generated tone. For example, an address for a tone of a negative frequency is generated if a polarity of an inputted frequency error value is positive. While an address for a tone of a positive frequency is generated if the polarity of the inputted frequency error value is negative. An address for a tone of a higher frequency as the inputted frequency error value becomes larger is generated. While an address for a tone of a lower frequency as the input frequency error value becomes smaller is generated.

The tone generator 300 further includes a first memory 320 for storing tone samples of a cosine tone of a real component and outputting corresponding tone samples according to an output of the address generator 310, a second memory 330 for storing tone samples of a sine tone and corresponding tone samples according to an output of the address generator 310, a first latch 340 for latching the tone samples of the first memory 320 corresponding to a length of the data symbols of the walsh decover 110, and a second latch 350 for latching the tone samples of the second memory 330 corresponding to a symbol length of the data symbols of the walsh decover 110. Herein, the first and second memories 320 and 330 store frequency samples for an in-phase (cosine) tone and a quadrature (sine) tone having a phase difference of 90° with respect to the in-phase tone.

Now, the first preferred embodiment of the present invention will be explained with reference to FIGS. 2, 4, and 5.

First, an input signal r(t) is despread with a PN code by a despreader 100, and then divided into a pilot component and a symbol component.

The pilot component is optionally accumulated for a specified time by an accumulator 121. The accumulated component or the pilot component is transferred to a differential circuit 122 and a first multiplier 125.

The differential circuit 122 produces an accumulated component or the pilot component, and transfers the frequency error value to a tone generator 124 through a Low Pass Filter 123.

The tone generator 124 generates an in-phase tone, and a quadrature tone having a phase difference of 90° from the in-phase tone based on the inputted frequency error value.

The first and second memories 320 and 330 of the tone generator 124 store tone samples of an in-phase component and a quadrature component having a phase difference of 90° from the in-phase component, respectively, and the frequency of the tone samples outputted from the memories 320 and 330 is adjusted based on an address of the address generator 310, respectively. The address generator 310 generates an address for a tone with a negative amplitude and phase if a polarity of the inputted frequency error value is positive, while the address generator 310 generates an address for a tone with a positive amplitude and phase if a polarity of the input frequency error value is negative. Also, the address generator 310 generates an address for a tone of a higher frequency as the input frequency error value becomes larger, while the address generator 310 generates an address for a tone of a lower frequency as the input frequency error value becomes smaller.

At this time, the address generator 310 initializes as '0' a variable A that indicates an address of the first and second memories 320 and 330 which store tone samples of one cycle of a tone, respectively. (step S10).

In a state that a certain variable A is initialized as '0', the address generator 310 receives the frequency error value FreqErr as its input (step S11).

The address generator 310 subtracts the frequency error value FreqErr from the variable A, and updates the initialized 'A' as a value of the subtracting result (step S12). At this time, the updated 'A' is adjusted so as to satisfy a relationship of 0≦A≦MS (where, MS is a memory size). Accordingly, when mapping an address according to a function f(A) of the address generator 310 onto the memories 320 and 330 that outputs tone samples of the address A, it is realized that f(A+n×MS)=f(A), where 'n' is an integer number.

The address generator 310 judges whether the 'A' of the subtracting result is smaller than '0' (step S13).

If 'A' of the subtracting result is smaller than '0' as a result of judgment (step S13), the address generator 310 updates the 'A' of the subtracting result as 'A+MS' and outputs the 'A+MS' to the memories 320 and 330 through an output port 'ADDR' (steps S14 and S17).

If 'A' of the subtracting result is not smaller than '0' as a result of judgment (step S13) and larger than or equal to MS (step S15), the address generator 310 updates the 'A' of the subtracting result as 'A−MS' and outputs the 'A−MS' to the memories 320 and 330 through the output port 'ADDR'. (step S16 and S17)However, if the 'A' of the subtracting result is not larger than or equal to MS as a result of judgment (step S15), the address generator 310 transfers the subtracting result 'A (A-FreqErr)' to the memories 320 and 330 (step S17).

The memories 320 and 330 transfers tone samples corresponding to the address of the variable 'A+MS' or 'A−MS' outputted from the address generator 310 to the first and second latches 340 and 350, respectively.

Figure 6:
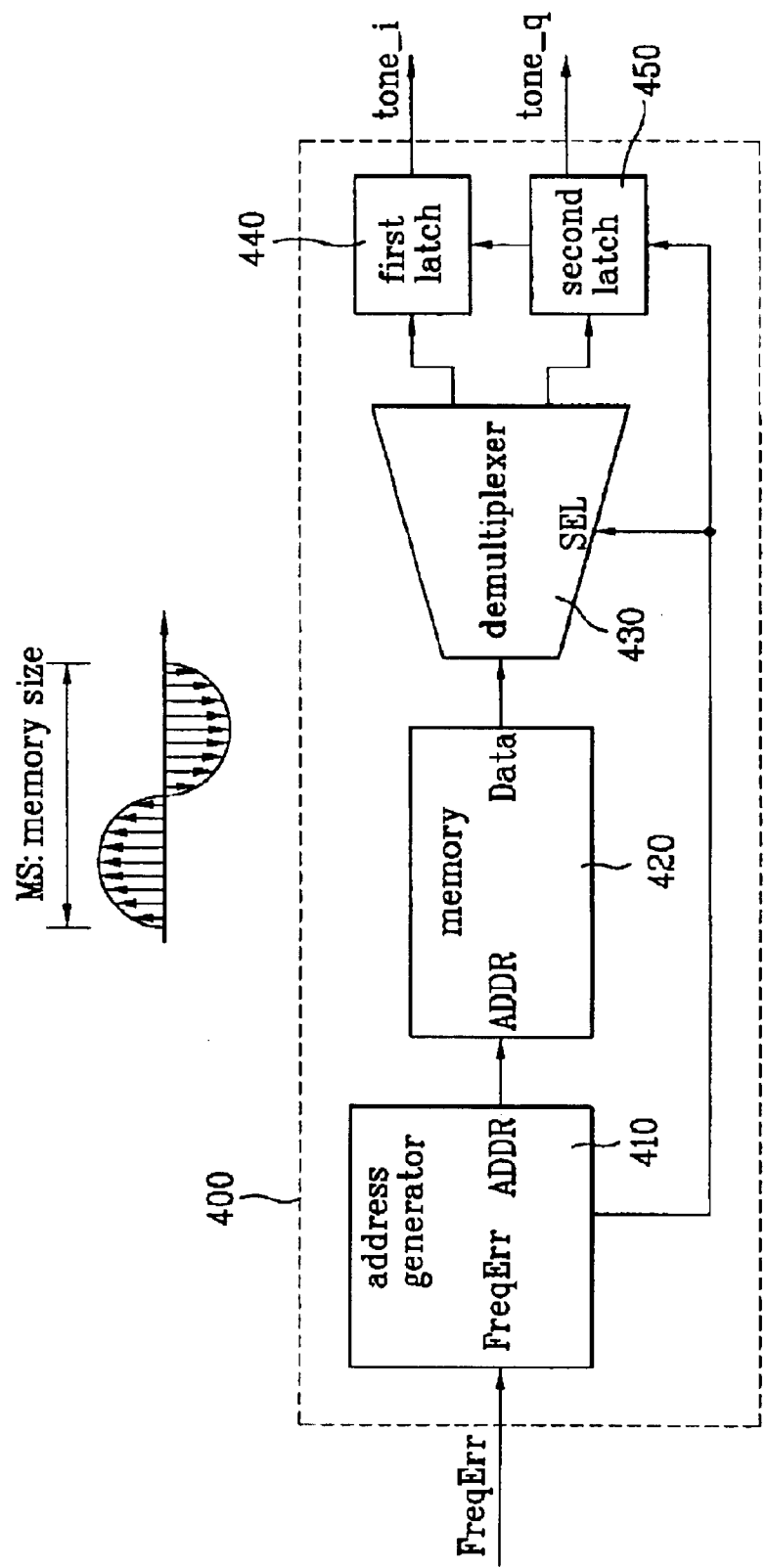
FIG. 6 is a block diagram of a tone generator of FIG. 3 according to the second preferred embodiment of the present invention.

FIG. 6 is a detailed block diagram of the tone generator of FIG. 3 according to the second preferred embodiment of the present invention.

Figure 7:
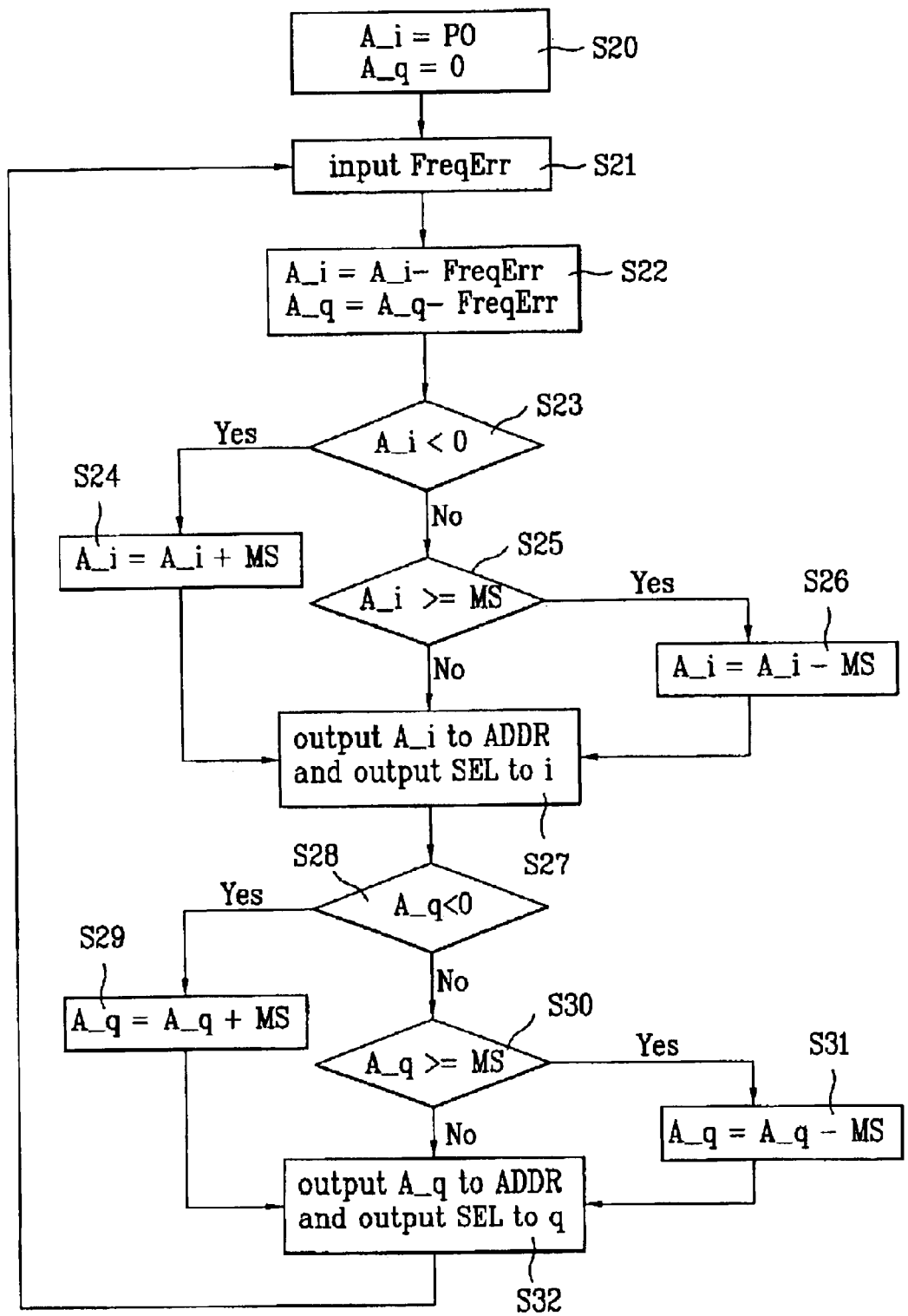
FIG. 7 is a flowchart illustrating a frequency error compensation method for a frequency error compensation apparatus provided with the tone generator of FIG. 6.

FIG. 7 is a flowchart illustrating the frequency error compensation method for the frequency error compensation apparatus provided with the tone generator of FIG. 6.

Referring to FIG. 6, the tone generator includes an address generator 410 for generating an address for an in-phase tone and an address for a quadrature tone having a phase offset (PO) of 90° from the in-phase tone, a memory 420 for storing tone samples for one of the in-phase tone and the quadrature tone and transferring tone samples with complex tone of the in-phase tone and the quadrature tone based on the address transferred from the address generator 410, a demultiplexer 430 for demultiplexing first tone samples of the in-phase tone and second tone samples of the quadrature tone to a first latch 440 and a second latch 450, latches 440 and 450 for latching the first tone samples and the second tone samples corresponding to a length of PN chips of the despread signal of the despreader 200, respectively.

The address generator 410 transfers an addresses to a memory 420 with a time-division multiplexing manner, the memory 420 for storing tone samples for one of the in-phase tone and the quadrature tone and transferring tone samples with complex tone of the in-phase tone and the quadrature tone based on the address transferred from the address generator 410, a demultiplexer 430 for demultiplexing first tone samples of the in-phase tone and second tone samples of the quadrature tone to a first latch 440 and a second latch 450, respectively, according to a selection (SEL) signal outputted from the address generator 410.

Specifically, the address generator 410 manages first addresses for the in-phase tone and second address for the quadrature tone with the difference as much as the phase offset (PO), respectively, and transfers the addresses for the in-phase tone and the quadrature tone to the memory 420 with a time-division multiplexing manner. The first and second tone samples outputted from the memory 420 are transferred to the first and second latches 440 and 450 by the demultiplexer 430 in accordance with the selection signal (SEL) outputted from the address generator 410.

Herein, if it is assumed that a variable of the address of the in-phase component is $A\_i$ and a variable of the address of the quadrature component is $A\_q$, these variables should be separately managed. Also, the variable $A\_i$ and the variable $A\_q$ have values in the range of $\{0,MS\}$, and thus has the difference as much as the phase offset PO.

For example, in case that a one-period since wave composed of 16 tone samples is stored in the memory 420, the memory size MS will be 16.

Also, a phase of a cosine wave precedes that of the sine wave, and thus if the variable $A\_i$ of the address of the cosine tone is indicative of '4' when the variable $A\_q$ of the address of the sine tone is indicative of '0', a complex tone having a real component (i.e., cosine wave) and an imaginary component (i.e., sine wave) may be generated using one memory 420 when necessary.

Referring to FIG. 7, the operation of the frequency error compensation apparatus having the tone generator according to the second preferred embodiment of the present invention is similar to that according to the first preferred embodiment of the present invention. Since the tone generator according to the second preferred embodiment should output the complex tone having two output components from one memory in a time-division multiplexing manner, its operation is as follows.

First, the address generator initializes the variables $A\_i$ and $A\_q$, that indicate the addresses of the memory which stores tone samples with one period of a tone, as '0' (step S20).

If the frequency error value FreqErr is inputted (step S21), the address generator 410 subtracts the frequency error value FreqErr from the variable $A\_i$, and updates a first subtracting-resultant value as the variable $A\_i$. The address generator 410 also subtracts the frequency error value FreqErr from the variable $A\_q$, and updates a second subtracting-resultant value as the variable $A\_q$ (step S22).

Then, the address generator 410 judges whether the stored $A\_i$ is smaller than '0' (step S23).

If $A\_i$ of the first subtracting-resultant value is smaller than '0' as a result of judgment (step S23), the updated variable $A\_i$ is adjusted to '$A\_i+MS$'. The address generator 410 transfers the variable the '$A\_i+MS$' to the memory 420, and simultaneously transfers an i-selection signal (SEL) to the demultiplexer 430 (steps S24 and S27).

If $A\_i$ of the first subtracting-resultant value is not smaller than '0' as a result of judgment (step S23), the address generator 410 further judges whether $A\_i$ of the first subtracting-resultant value is larger than or equal to MS (step S25).

If $A\_i$ of the first subtracting-resultant value is not smaller than '0' and is larger than or equal to MS as a result of judgment (step S25), the updated variable $A\_i$ is adjusted to '$A\_i-MS$'. The address generator 410 transfers the '$A\_i-MS$' to the memory 420, and simultaneously transfers the i-selection signal(SEL) to the demultiplexer 430 (steps S26 and S27).

However, if $A\_i$ of the first subtracting-resultant value is not smaller than '0' and is not larger than or equal to MS as a result of judgment (step S25), the updated $A\_i$ (A-FreqErr) is outputted to the memory, and simultaneously the i-selection signal (SEL) is outputted to the demultiplexer 430 (step S27).

The address generator 410 also judges whether the $A\_q$ of the second subtracting-resultant value is smaller than '0' (step S28).

If the $A\_q$ of the second subtracting-resultant value is smaller than '0' as a result of judgment (step S28), the variable $A\_q$ of the second subtracting-resultant value is adjusted to '$A\_q+MS$'. The address generator 410 transfers the '$A\_q+MS$' to the memory 420, and simultaneously transfers a q-selection signal (SEL) to the demultiplexer 430 (steps S29 and S32).

If $A\_q$ of the second subtracting-resultant value is not smaller than '0' as a result of judgment (step S28), the address generator 410 judges whether $A\_q$ of the second subtracting-resultant value is larger than or equal to MS (step S30).

If $A\_q$ of the second subtracting-resultant value is larger than or equal to MS as a result of judgment (step S30), the variable $A\_q$ of the second subtracting-resultant value is adjusted to '$A\_q-MS$'. The address generator 410 transfers '$A\_Q-MS$' to the memory 420, and simultaneously transfers the q-selection signal (SEL) to the demultiplexer 430 (steps S31 and S32).

However, if $A\_Q$ of the second subtracting-resultant value is not smaller than '0' and is not larger than or equal to MS as a result of judgment (step S28), the address generator 410 transfers A_q of the second subtracting-resultant value to the memory 420, and simultaneously transfers the q-selection signal to the demultiplexer 430 (step S32).

The demultiplexer 430 transfers corresponding tone samples outputted from the memory 420 to the first latch and the second latch 450 according to the selection signals (i-selection signal and q-selection signal) of the address generator 410.

As described above, according to the frequency error compensation apparatus and method in a communication system according to the present invention, a receiver generates the tone by measuring the frequency error value due to the user's moving speed, etc., and thus the frequency error is reduced to improve the performance of the receiver.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of compensating a frequency error in a communication system, comprising:

estimating a frequency error value by differentiating a pilot signal of a received signal;

generating an address signal corresponding to the frequency error value;

generating a tone from at least one memory based on the address signal; and compensating a data signal of the received signal for frequency error based on the tone.

2. The method of claim 1, wherein compensating the data signal of the received signal for frequency error compensates at a symbol level.

3. The method of claim 1, further comprising:

latching the tone mapped to the address signal corresponding to symbols-length of the data signal.

4. The method of claim 3, wherein generating said address signal generates the address signal for a positive tone sample if a polarity of the frequency error value is negative.

5. The method of claim 3, wherein generating said address signal generates the address signal for a negative tone sample if a polarity of the frequency error value is positive.

6. The method of claim 3, wherein generating said address signal generates the address signal for a tone sample having a frequency increased in proportion to the frequency error value.

7. The method of claim 3, further comprising outputting first tone samples mapped onto a first address signal and second tone samples, which are mapped onto a second address signal having a predetermined frequency offset over the first tone samples.

8. The method of claim 3, wherein said address signal is adjusted so as not to get out of a size of corresponding storing section which store the tone sample.

9. The method of claim 1, wherein compensating the data signal of the received signal for frequency error compensates at a chip level.

10. A method comprising:

despreading a received signal;

estimating a frequency error value by differentiating the despread signal;

generating a tone based on the frequency error value;

generating addresses corresponding to the frequency error value and a control signal according to a type of the addresses;

latching tone samples mapped onto the addresses corresponding to a length of chips of the despread signal; and compensating the despread signal for frequency error based on the tone.

11. The method of claim 10, wherein generating generates the addresses for positive tone samples if a polarity of the frequency error value is negative.

12. The method of claim 10, wherein generating generates the addresses for negative tone samples if a polarity of the frequency error value is positive.

13. The method of claim 10, wherein generating generates the addresses for tone samples having a frequency increased in proportion to the frequency error value.

14. The method of claim 10, further comprising:

outputting with a time division method first tone samples mapped onto a first address and second tone samples, which are mapped onto a second address and have a predetermined phase offset over the first tone samples; and demultiplexing the first tone samples and the second tone samples according to the control signal.

15. The method of claim 10, wherein the addresses are adjusted so as not to get out of a size of a storing section which stores the tone samples.

16. The method of claim 14, wherein the first address and the second address are outputted according to the time division method.

17. The method of claim 10, further comprising:

outputting complex tone samples of first tone samples mapped onto a first address and second tone samples, which are mapped onto a second address and have a predetermined phase offset over the first tone samples; and demultiplexing the first tone samples and the second tone samples according to the control signal.

18. An apparatus for correcting frequency error in a communication system, comprising:

differentiating means for differentiating a pilot signal of a received signal to estimate a frequency error value;

a tone generator for generating a tone based on an address signal, wherein the tone generator comprises:

an address generator for generating the address signal based on the frequency error value, and at least one memory for storing tone samples to output the tone corresponding to the address signal; and a compensator for compensating a data signal of the received signal for frequency error based on the tone.

19. The apparatus of claim 18, wherein the compensator compensates the data signal of the received signal for frequency error at a symbol level.

20. The apparatus of claim 18, further comprising:

a plurality of latch means for latching the output of the at least one memory corresponding to a symbol rate of the data signal.

21. The apparatus of claim 20, wherein the address generator generates the address signal for positive tone samples if a polarity of the frequency error value is negative.

22. The apparatus of claim 20 wherein the address generator generates the address signal for negative tone samples if a polarity of the frequency error value is positive.

23. The apparatus of claim 20, wherein the address generator generates the address signal for tone samples having a frequency increased in proportion to the frequency error value.

24. The apparatus of claim 20, wherein the at least one memory comprises a plurality of memories for generating first tone samples mapped Onto a first address signal and second tone samples, which are mapped onto a second address signal and have a predetermined frequency offset over the first tone samples.

25. The apparatus of claim 24, wherein the address generator adjusts the first and second address signals so as not to exceed a size of the memories.

26. The apparatus of claim 18, wherein the compensator compensates the data signal of the received signal for frequency error at a chip level.

27. An apparatus for correcting a frequency error in a communication system comprising:
    differentiating means for differentiating a pilot signal of a received signal to estimate a frequency error value;
    a tone generator for generating a tone based on an address signal, wherein the tone generator comprises:
        an address generator for generating the address signal based on the frequency error value, and
        at least one memory for storing tone samples to output the tone corresponding to the address signal; and
    a compensator for compensating the received signal for frequency error based on the tone.

28. The apparatus of claim 27, wherein the address generator generates the address signal for positive tone samples if a polarity of the frequency error value is negative.

29. The apparatus of claim 27, wherein the address generator generates the address signal for negative tone samples if a polarity of the frequency error value is positive.

30. The apparatus of claim 27, wherein the address generator generates the address signal for tone samples having a frequency increased in proportion to the frequency error value.

31. The apparatus of claim 27, wherein the at least one memory comprises a memory for storing first tone samples mapped onto a first address signal and second tone samples, which are mapped onto a second address signal and have a predetermined phase offset over the first tone samples and outputting the tone samples with a time division method; and
    a demultiplexer for demultiplexing the first tone samples and the second tone samples according to a control signal.

32. The apparatus of claim 31, wherein the address generator adjusts the first and second address signals so as not to exceed a size of the memory.

33. The apparatus of claim 31, wherein the address generator outputs the first address signal and the second address signal according to the time division method.

34. The apparatus of claim 27, wherein the at least one memory comprises a memory for outputting complex tone samples of first tone samples mapped onto a first address signal and second tone samples, which are mapped onto a second address signal and have a predetermined phase offset over the first tone samples and storing the tone samples; and
    demultiplexing the first tone samples and the second tone samples according to a control signal.

35. The apparatus of claim 27, wherein the tone generator further comprises a plurality of latch means for latching the output of the memory corresponding to a pseudo noise (PN) chip rate.

36. The apparatus of claim 27, wherein the received signal comprises an output signal having a multiplied pseudo noise (PN) code.

* * * * *